United States Patent [19]

Strohmeyer, Jr.

[11] 4,442,797
[45] Apr. 17, 1984

[54] GAS AND PARTICLE SEPARATION MEANS FOR A STEAM GENERATOR CIRCULATING FLUIDIZED BED FIRING SYSTEM

[75] Inventor: Charles Strohmeyer, Jr., Gladwyne, Pa.

[73] Assignee: Electrodyne Research Corporation, Gladwyne, Pa.

[21] Appl. No.: 462,016

[22] Filed: Jan. 24, 1983

[51] Int. Cl.³ .............................................. F22B 1/00
[52] U.S. Cl. ................................... 122/4 D; 110/245; 110/263; 431/170
[58] Field of Search .................... 122/4 D; 431/7, 170; 110/245, 263; 165/104.16

[56] References Cited

U.S. PATENT DOCUMENTS

| | | | |
|---|---|---|---|
| 4,165,717 | 8/1979 | Reh et al. | 431/170 |
| 4,184,455 | 1/1980 | Talmud et al. | 122/4 D |
| 4,250,839 | 2/1981 | Daman | 110/263 |
| 4,301,771 | 11/1981 | Jukkola et al. | 122/4 D |

Primary Examiner—Edward G. Favors
Assistant Examiner—Steven E. Warner
Attorney, Agent, or Firm—William J. Ruano

[57] ABSTRACT

The invention comprises a steam generator having a circulating fluidized bed firing system. Particles of fuel and solid inert material are recirculated in a furnace wherein gas velocities are maintained at levels sufficient to entrain the fuel and inert material particles in the gas stream. A plenum is provided at the furnace outlet wherein gas velocity drops below entrainment level and the particles are directed to a collection hopper for recycle. The gas is withdrawn from the plenum through ducting in a manner to assure uniform gas distribution through the plenum. High gas velocity through the ducting improves heat transfer in the fluid cooled enclosure surface where such surface is incorporated into the ducting. The ducting connect to the downstream gas path.

6 Claims, 2 Drawing Figures

GAS AND PARTICLE SEPARATION MEANS FOR A STEAM GENERATOR CIRCULATING FLUIDIZED BED FIRING SYSTEM

This invention relates to means for improving the performance of steam generators having circulating fluidized bed combustion systems.

This invention is a continuation-in-part of U.S. patent application Ser. No. 456,586 Filed 1/07/83 and is an improvement thereupon. In the present invention gas flow is parallel through plenums 43 and 44 instead of serially as previously indicated. Gas flows from plenums 43 and 44 through external ducting to the downstream gas stream and heat exchange surface. The present invention more effectively utilizes the volumetric space of plenums 43 and 44 as well as assists in heat transfer associated with plenum 43 and 44 fluid cooled enclosure Particle collection in plenum 44 is substantially complete.

The present invention similar to the previously referenced application overcomes spacial and construction problems associated with particle and gas separators which are external to the conventional steam generator gas path.

Gas and particle separation is achieved through effective use of the steam generator waterwall enclosure heat transfer circuits thus reducing overall cost of the unit with minimal use of refractories.

For the steam generator described herein a specific object of this invention is to provide a gas and particle separation means at the outlet of the furnace in association with a circulating fluidized bed firing system.

A further object is to accomplish separation of gas and particles by means of gas velocity reduction in a plenum to permit settlement of the particles of fuel and inert material from the gas stream.

A still further object is to supply gas to and to draw gas from the settlement plenum in a manner to create uniform flow through the plenum with minimum agitation to facilitate solid particle separation from the gas.

A still further object is to direct the separated particles to a removal hopper.

A still further object is to collect gas by drawing it from the plenum in a manner to improve the heat transfer duty of the fluid cooled plenum enclosure external to the plenum.

A still further object is to return gas, after removal of the solid particles, to the downstream portion of the gas path.

This invention will be described in detail with reference to the accompanying drawings, wherein.

Figure 1:
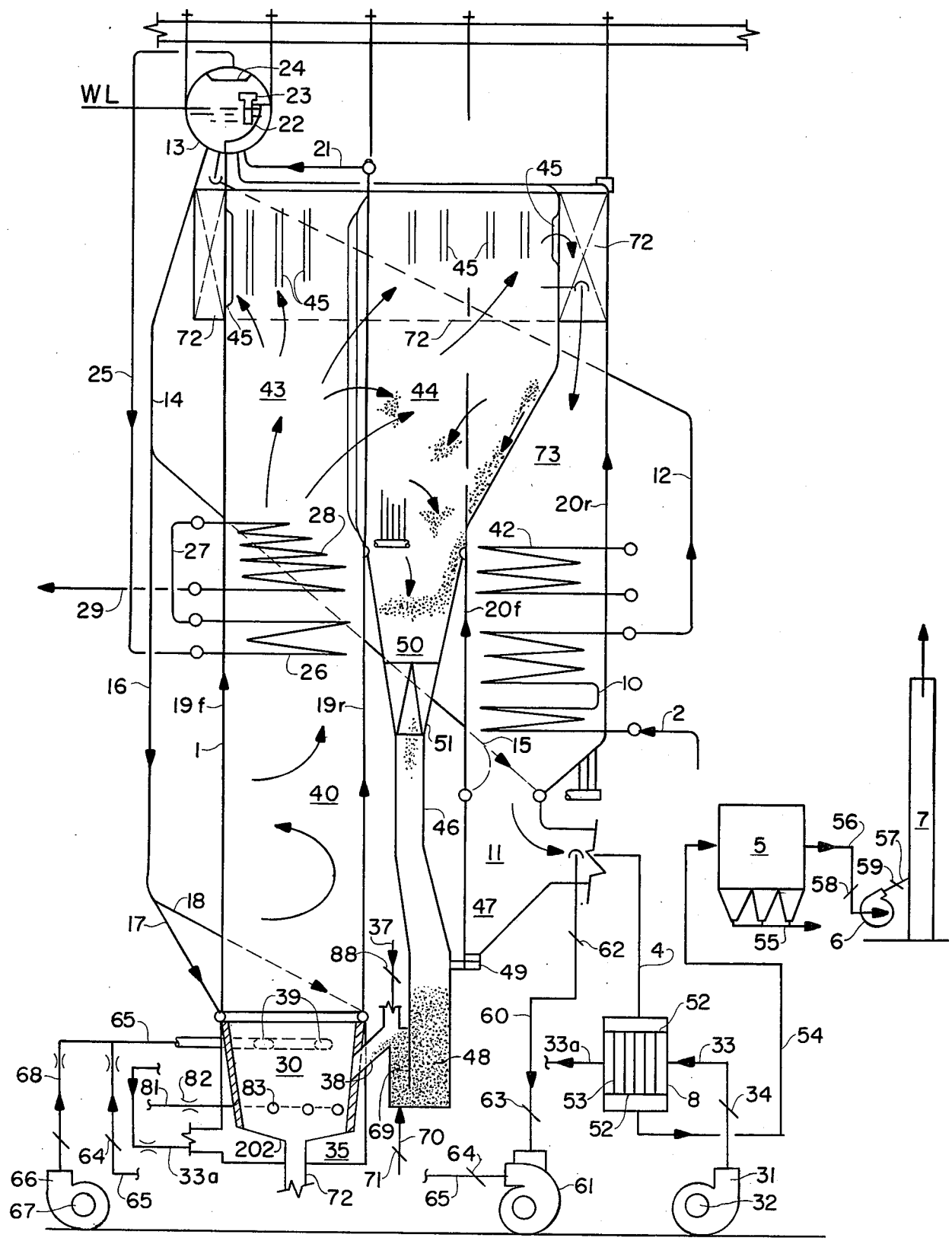
FIG. 1 is a side elevation diagram of a steam generator having solid particle separation means in accordance with this invention.

On FIG. 1, steam generator 1 is of a conventional design with regard to the fluid circuits. Feedwater at the working pressure enters the unit through conduit 2. Conduit 2 feeds to economizer 10 which lowers exit gas temperature in duct 11.

Effluent from economizer 10 passes through conduit 12 to drum 13 from whence it passes through conduits 14, 15, 16, 17 and 18 to lower waterwall headers which supply the furnace and convection pass waterwalls 19f, 19r, 20f and 20r. The waterwalls, including sidewalls, are of the membrane type. Waterwalls 19f, 20f and 20r discharge to drum 13. The rear furnace wall 19r is connected to drum 13 through conduit 21.

Baffle 22 within drum 13 directs the steam and water mixture to separators 23. Separated water exits from the bottom of separators 23 and joins with feedwater from conduit 12 and is recirculated downward through conduit 14. Separated steam passes through the top of separators 23 through baffles and up through outlet screens 24 to conduit 25.

Conduit 25 connects to primary superheater 26 and through conduit 27 to secondary superheater 28 from whence it flows out through conduit 29 to a steam consumer (not shown).

Water level WL in drum 13 is maintained at a fixed set point by control of feedwater flow through conduit 2 (not shown).

Combustor 30 is of a bubbling bed type the lower portion wherein particles of fuel and inert material disperse themselves through out the bed.

F. D. fan 31 takes air from atmosphere through inlet vanes 32 which control air flow. F.D. fan 31 discharges through duct 33 and shutoff damper 34 (for isolation purposes) to air heater 8. The hot air then passes through duct 33a to plenum chamber 35.

Plenum chamber 35 feeds air to combustor 30 through sized holes in the floor 202 of combustor 30.

Primary fuels, as coal, are fed to combustor 30 through conduit 37. Where $SO_2$ removal is required, limestone is injected with the fuel through conduit 37. Flow control means 88 regulates rate of flow through conduit 37. Fuels as coal along with limestone are stored upstream of flow control means 88 and mixing of the two is not part of this invention. When firing oil in combustor 30, limestone may be fed individually with the inert material through conduit 37. Secondary fuels as trash and waste products may enter combustor 30 along with the primary fuel through conduits 37 and 38.

Ignition begins in the lower portion of combustor 30 and as the particles of fuel and inert material rise in the fluidized bed through displacement by fuel and limestone and inert material which is added through conduit 38, they reach the level at which ports 39 are located. Ports 39 supply secondary gas flow which generates sufficiently high gas velocities at this point to entrain desired quantities of bed solids in the gas flow, carrying such solids upward into furnace 40.

The density of the bed solids in furnace 40 decreases as penetration into the downstream gas path increases. The particle velocities also increase with penetration due to diminution in size. There is a velocity increase after the gas enters surface 26 and 28 in series. A gas velocity decrease occurs at the exit of the tube banks.

Surface 42 can be reheating surface or an extension of or an alternative for superheating or economizer surface.

Reaction or fuel burnup extends upward as required for heat transfer balance. It is desirable to cool the gas around sections 26 and 28 from a level of 1550 F in furnace 40 to a lesser value. This reduces the volume of the gas as well as gas velocity.

Spacing of platens 26 and 28 take into account volumetric decreases as gas temperatures decrease so as to sustain desired particle entrainment gas velocity to the outlet of surface 28 at the top of the vertical column.

The volumetric relationship within plenums 43 and 44 is such to permit the gas velocity to drop below entrainment level at the outlet of platens 28 to permit settlement of the fuel and inert material particles which fall downward into hopper 50. Particles collected in hopper 50 drop through transition piece 51 to conduit 46 and storage bin 48.

Gas passes from plenum 43 to plenum 44 through rear furnace wall tubes 19r at which point the membrane is lacking and alternating tube have been spread sufficiently to permit passage of gas.

The tube configuration of surface 28 is such to assist in distribution of gas flow to plenums 43 and 44. The topmost tube lengths are shortened on the waterwall 19r end so that gas slips out sidewise from tube bank 28 at the outlet end in the direction of plenum 44. The greater resistance in the upward direction of plenum 43 overcomes part of the gas velocity head and facilitates good gas dispersion throughout the two plenums 43 and 44.

Gas flows upward to the top of plenums 43 and 44 where it exits through ports 45 which are distributed around the front, rear and sidewalls of the combined plenum 43 and 44. Ports 45 are waterwall tubes which have been upset so that they are out of the wall plane leaving a slot open in the waterwalls for the passage of gas from plenums 43 and 44 to duct 72 which forms a ring around plenums 43 and 44 as a unit. The waterwalls may serve as the inside face of duct 72.

The duct 72 surfaces opposite the waterwalls are thermally protected with molded refractory on the inside surface of the ducting (not shown). Duct 72 discharges to plenum 73 which is above tube surfaces 42 and 10.

The ports 45 are individually located and sized and the cross section areas of duct 72 are sized so as to maintain uniform gas flow through all zones of plenums 43 and 44 which are adjacent to ports 45. The gases passing through ports 45 pass through duct 72 to plenum 73.

The gas velocities adjacent to the waterwalls in plenums 43 and 44 are low due to the volumetric relationships. This reduces the heat transfer from the gas to the waterwalls on the plenum 43 and 44 side. The gas velocity in duct 72 is high which accelerates heat transfer from the gas to the waterwall portion forming part of duct 72. This compensates in part for the loss of heat transfer duty on the plenum 43 and 44 side of the waterwalls.

Gas from plenum 73 flows through surface 42 and 10 to plenum 11.

Solid particles collected in plenum 11 fall to hopper 47. Rotary feeder 49 is power driven and feeds dust from hopper 47 to bin 48 and is provided with a displacement type of seal to prevent reverse flow.

The gas from plenum 11 passes through duct 4 to air heater 8.

Air heater 8 is provided with tube sheets 52 in which tubes 53 are mounted. The gas from duct 4 passes through tubes 53 to duct 54. F.D. fan 31 discharge air flow passes around tubes 53. Gas duct 54 passes to bag house 5 where dust collection is completed. Dust separated in the bags is removed through conduits 55.

Bag house 5 discharges through duct 56 to I.D. fan 6 and duct 57 to stack 7 and from thence to atmosphere. Dampers 58 and 59 are for isolation purposes and to regulate flow of gas so as to maintain a slightly negative pressure in furnace 40.

Gas from plenum 11 is drawn through conduit 60 to gas recirculation fan 61. Dampers 62 and 64 are for isolation purposes. Damper 63 is for flow control. Gas recirculation fan 61 discharges through duct 65 to secondary gas ports 39 for developing gas velocities sufficient to entrain solid particles upward into the furnace 40.

Secondary air fan 66 takes air from atmosphere through inlet vanes 67 and discharges through duct 68 to duct 65 supplementing gas recirculation flow when additional air flow is required for combustion purposes. Secondary air flow at times may completely replace gas recirculation flow. Admission of secondary air permits air to be fed both under and over the point of fuel injection into combustor 30. In such manner ignition characteristics in combustor 30 can be controlled.

Solid particles collected in bin 48 pass through loop seal 69. Dust flow through loop seal 69 is facilitated by means of an air lift. Air under pressure enters through conduit 70 and flow is controlled by regulation means 71 which is power operated.

The recirculation loop of the circulating fluidized bed combustion system can be described as follows: The combustor 30 is not subject to entrainment gas velocities below ports 39. The lower bed overflows above the secondary gas ports 39 by addition of fuel and limestone and recirculated solid particles through conduit 38.

Gas flow through secondary gas ports 39 lifts the bed materials up into furnace 40 as a result of gas entrainment velocities. Solid particles are collected in hopper 50 since gas velocities in plenums 43 and 44 drop below entrainment values. Hopper 50 material drops through piece 51 and conduit 46 to bin 48. From bin 48 solid particles pass through loop seal and air lift 69 to conduit 38 and back to combustor 30 for recycle.

The ratio of fuel to inert material within the bed should be about the same for both fixed and circulating type fluidized bed systems.

Ash can be removed from the circulating loop through the opening at the bottom of combustor 30 and through conduit 72 which is water cooled (not shown). Ash is removed on a continuing basis to maintain equilibrium in the combustion system.

Oil or gas can be admitted through conduit 81, flow control means 82 and nozzles 83 into combustor 30 for firing during unit startup or for use as a supplemental or emergency fuel during times when the design fuel supply has been interrupted. Nozzles 83 are equipped with ignition means.

Figure 2:
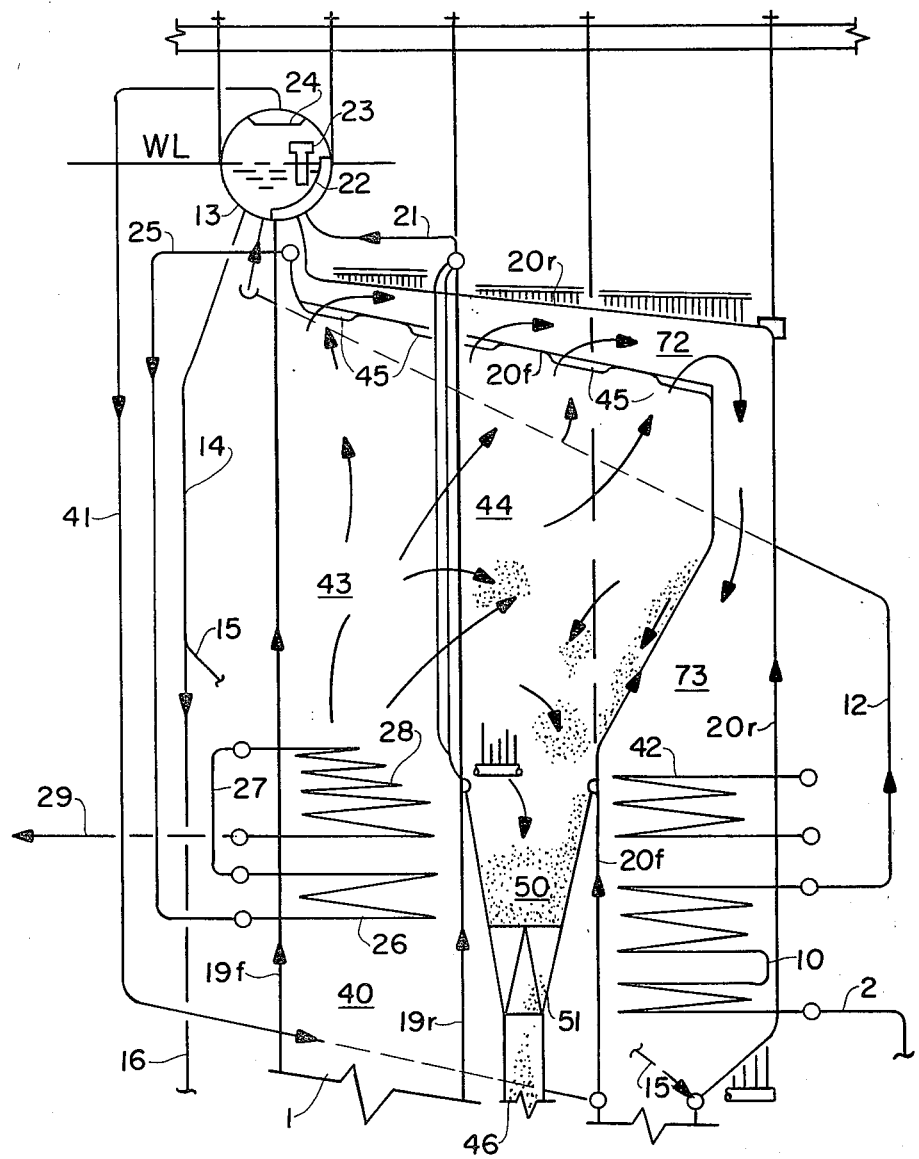
FIG. 2 is an alternative arrangement of the solid particle separation means.

FIG. 2 is a variation of FIG. 1. The same principles apply for both configurations. In FIG. 2, duct 72 is formed by the continuation of walls 20f and 20r, with a space between, over plenums 43 and 44. The walls 20f and 20r are of the membrane type wherein metal strips are welded in place between parallel tube circuits to make a gas tight enclosure.

Ports 45 are located in the roof plane 20f and are formed by upsetting individual tubes for specified lengths from the plane of the tube and membrane sheet. Where the welded in membranes are of sufficient width, slots 45 can be formed by the omission of the membranes in specified locations.

Ports 45 are spaced and sized to create uniform gas distribution up through plenums 43 and 44. The overall configuration is such to avoid turbulence of the gas flow as it passes from tube bank 28 through plenums 43 and 44 to ports 45.

Wall and roof enclosure 20f may be steam cooled as an alternative for water cooling as shown on FIG. 1. In such case steam from drum 13 would be drawn through conduit 41 to the inlet header for wall 20f. Steam flow up through the tubes cools the wall and cieling 20f.

Steam exits through conduit 25 and flows to tube bank 26 in the gas path for further superheating.

The nature of the cooling medium in enclosure circuits 20f and 20r is not part of this invention and relates to standard methods for designing and building steam generators.

Thus, it will be seen that I have provided an efficient embodiment of my invention, whereby a means is provided, for a steam generator having a circulating fluidized bed firing system, to separate gas and solid particles of fuel and inert material, the solid particles being returned to the upstream end of the circulating bed for recirculation through the bed, the separation of solid particles being accomplished by gravity as the velocity of the gas stream decreases below particle entrainment level in a plenum chamber, means are provided for passing gas through the plenum chamber without turbulance, gas being drawn from the plenum chamber in a manner to improve heat transfer to the plenum fluid cooled enclosure, the gas after solid particle separation being returned to the downstream steam generator gas path.

While I have illustrated and described several embodiments of my invention, these are by way of illustration only and various changes and modifications may be made within the contemplation of my invention and within the scope of the following claims:

I claim:

1. A steam generator having a feedwater inlet and steam outlet and coolant filled heat absorption circuits disposed in between, a vertical up flow furnace, walls for said furnace including a first portion of said heat absorption circuits, a combustion system contained by said furnace comprising a first ignition and reaction zone at the bottom of said furnace, means for continuously feeding solid fuel and air to said first zone sustaining combustion and generating hot flue gas, a second zone above said bottom of said furnace including means for admission of secondary gas to said furnace, means for overflowing said hot flue gas and said solid fuel from said first zone along with recycled solids up into said second zone to form a combined gas stream, means to maintain velocity of the combined gas stream in and above said second zone in a relatively constant range and sufficient for entraining in said combined gas stream a substantial portion of said overflowed solid fuel and recycled solids, said combustion reaction continuing in and above said second zone consuming said solid fuel, said recycled solids in said substantial portion maintaining said combined gas stream in a suppressed and controlled temperature range, an enclosure for said combined gas stream at said furnace outlet to continuously expand said combined gas stream in an upward direction, said enclosure forming an expanding plenum and a baffle at the outlet end, said enclosure configuration and said combined gas stream expansion causing said velocity of said combined gas stream in said plenum to decrease sufficiently enabling inertial separation and settlement of most of said solids entrained in said combined gas stream, orificed ports uniformly distributed in said baffle comprising means to draw said combined gas stream discharging from said furnace up into said expanding plenum in an even and striated flow path, a hopper offset from the horizontal plane of said furnace at the bottom of said plenum, at least a portion of said combined gas stream discharge passing over said hopper and directing said separated solids during settlement toward said hopper for collection, means for recycling said collected solids as recycled solids between said first and second zones, means for collecting said combined gas discharged from said orifices and passing said combined gas through a convection section comprising a second portion of said heat absorption circuits, for cooling said combined gas, and means for disposing of said cooled combined gas.

2. A steam generator as recited in claim 1, and including a third portion of said heat absorption circuits disposed between said furnace and said plenum and an enclosure for said third portion having a horizontal cross sectional area at least equivalent to said furnace outlet cross section area.

3. A steam generator as recited in claim 1 and wherein at least a portion of said secondary gas comprises air, including a fan or blower adapted for delivering said air to said secondary gas admission means.

4. A steam generator as recited in claim 3 and wherein a second portion of said secondary gas combines a portion of said combined gas downstream of said orifices and preferably after cooling, including a fan or blower for recirculating said portion of said combined gas to said secondary air admission means, means to vary the proportions of said air and said recirculated combined gas supplied to said secondary gas admission means.

5. A steam generator as recited in claim 1, said plenum enclosure incorporated with said first portion of said heat absorption circuits.

6. A steam generator as recited in claim 5, said convection section enclosure incorporated with said first portion of said heat absorption circuits including said plenum enclosure.

* * * * *